(12) United States Patent
Miyazawa

(10) Patent No.: US 11,099,365 B2
(45) Date of Patent: Aug. 24, 2021

(54) ZOOM LENS AND IMAGE PICKUP APPARATUS

(71) Applicant: CANON KABUSHIKI KAISHA, Tokyo (JP)

(72) Inventor: Nobuyuki Miyazawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 209 days.

(21) Appl. No.: 16/425,716

(22) Filed: May 29, 2019

(65) Prior Publication Data

US 2019/0369372 A1 Dec. 5, 2019

(30) Foreign Application Priority Data

Jun. 5, 2018 (JP) .............................. JP2018-107576

(51) Int. Cl.
*G02B 15/20* (2006.01)
*G02B 15/163* (2006.01)
*G02B 13/00* (2006.01)

(52) U.S. Cl.
CPC ......... *G02B 15/163* (2013.01); *G02B 13/009* (2013.01); *G02B 15/20* (2013.01)

(58) Field of Classification Search
CPC ..... G02B 15/163; G02B 15/20; G02B 13/009
USPC ........................................................ 359/694
See application file for complete search history.

(56) References Cited

U.S. PATENT DOCUMENTS

2013/0258130 A1* 10/2013 Mihara .............. G02B 15/1461
348/222.1
2015/0226946 A1 8/2015 Miyazaki

FOREIGN PATENT DOCUMENTS

| CN | 106094184 A | 11/2016 |
| CN | 106772965 A | 5/2017 |
| JP | 2012-242617 A | 12/2012 |
| JP | 2017-116609 A | 6/2017 |
| WO | 2013/136692 A1 | 9/2013 |

* cited by examiner

*Primary Examiner* — James R Greece
(74) *Attorney, Agent, or Firm* — Canon U.S.A., Inc. IP Division

(57) ABSTRACT

A zoom lens includes, in order from an object side, a positive first unit, a negative second unit, a positive intermediate group consisting of one or two units and including a third unit located on a most object side, a negative unit, and a rear group consisting of one or two units including a positive unit located on a most object side. Conditional expressions are satisfied with respect to amounts of movement of the second and third units from a wide angle end to a telephoto end, a distance at the wide angle end from a most object side surface vertex in the first unit to a most object side surface vertex in the third unit, an Abbe number of a most object side lens in the first unit, a focal length of the second unit, and focal lengths at the wide angle end and at the telephoto end.

18 Claims, 17 Drawing Sheets

ZOOM LENS AND IMAGE PICKUP APPARATUS

BACKGROUND OF THE INVENTION

Field of the Invention

The aspect of the embodiments relates to a zoom lens and an image pickup apparatus.

Description of the Related Art

With the benefits of higher definition monitors in recent years, zoom lenses to be mounted on digital cameras, video cameras, television cameras, and so forth have been facing an increasing demand for improvement in image quality without compromising on reduction in size. In light of the improvement in image quality, high resolution may still result in poor reproducibility of an object if there is a large chromatic aberration. In this regard, reduction in chromatic aberration is an important issue.

As a zoom lens capable of efficiently securing a zoom ratio with a small size, there has heretofore been known a zoom lens configured to correct an image-plane movement associated with zooming by use of a first lens unit having a positive refractive power, a second lens unit having a negative refractive power, and a third lens unit having a positive refractive power, and more lens units located closer to an image side than the third lens unit, the lens units being arranged in order from an object side.

For example, International Publication No. WO2013/136692 discloses a zoom lens that has a zoom ratio of about 10 and includes lens units having positive, negative, positive, negative, and positive refractive powers arranged in order from an object side, in which the first lens unit and the fifth lens unit are configured not to move for zooming. Japanese Patent Application Laid-Open No. 2012-242617 discloses a zoom lens that has a zoom ratio of about 10 and includes lens units having positive, negative, positive, negative, and positive refractive powers arranged in order from an object side, in which the first lens unit includes a reflective member and the first lens unit and the fifth lens unit are configured to not move for zooming.

International Publication No. WO2013/136692 intends to achieve reduction in size by making the second lens unit, the third lens unit, and the fourth lens unit movable. Nonetheless, this zoom lens still has room for improvement for suppressing a variation in chromatic aberration associated with zooming.

In Japanese Patent Application Laid-Open No. 2012-242617, the second lens unit and lens units disposed in the image side of the second lens unit have small diameters in order to make a slim image pickup apparatus that includes an optical system configured to bend light with the reflective member in the first lens unit. This configuration still has an issue in light of reducing a total length of the zoom lens.

SUMMARY OF THE INVENTION

A zoom lens of the disclosure includes in order from an object side to an image side: a first lens unit having a positive refractive power and configured not to move for zooming; a second lens unit having a negative refractive power; an intermediate lens group consisting of one or two lens units having a positive refractive power, including a third lens unit located on a most object side in the intermediate lens group; a lens unit having a negative refractive power; and a rear lens group consisting of one or two lens units including a lens unit having a positive refractive power and located on a most object side in the rear lens group. Here, an interval between each pair of two adjacent lens units for zooming. Each of the first lens unit and the second lens unit includes at least three lenses. conditional expressions:

$$-10 < m2/m3 < -0.5;$$

$$2.0 < L3w/fw < 8.7;$$

$$27.0 < v1 < 45.0; \text{ and}$$

$$-0.4 < f2/ft < -0.1,$$

are satisfied where m2 is an amount of movement of the second lens unit from a wide angle end to a telephoto end, m3 is an amount of movement of the third lens unit from the wide angle end to the telephoto end, each of m2 and m3 has a positive value in a case where a corresponding lens unit at the telephoto end is located on the image side relative to the corresponding lens unit at the wide angle end, L3w is a distance at the wide angle end from a vertex of a lens surface located closest to the object side in the first lens unit to a vertex of a lens surface located closest to the object side in the third lens unit, v1 is an Abbe number of the lens located closest to the object side in the first lens unit, f2 is a focal length of the second lens unit, fw is a focal length at the wide angle end, and ft is a focal length at the telephoto end.

Further features of the disclosure will become apparent from the following description of exemplary embodiments with reference to the attached drawings.

DESCRIPTION OF THE EMBODIMENTS

Figure 1:
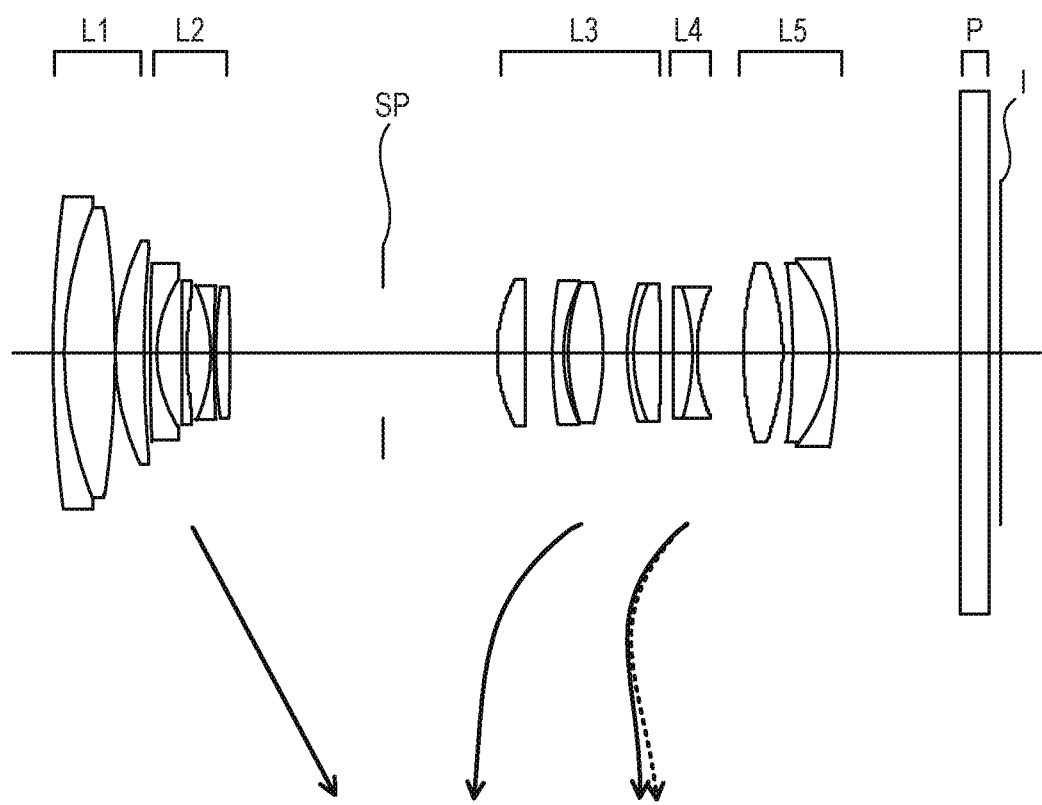
FIG. 1 is a cross-sectional view of lenses in an optical system of a numerical embodiment 1.
Figure 2:
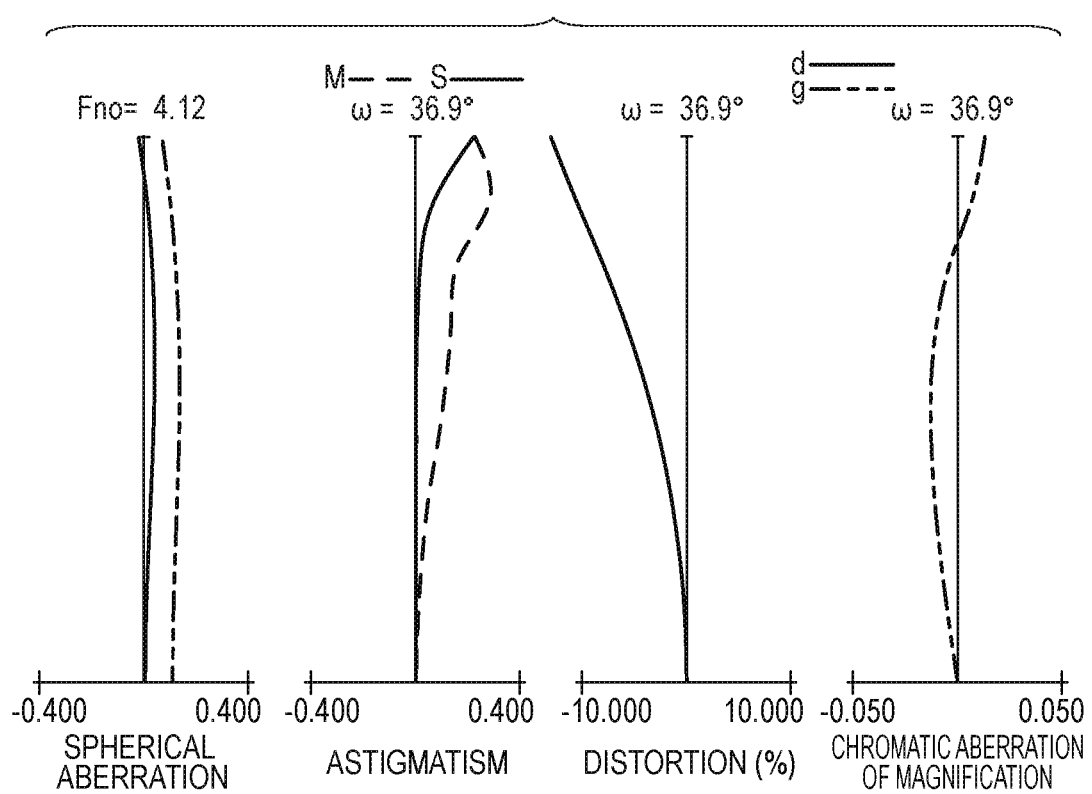
FIG. 2 illustrates aberration diagrams at a wide angle end of the numerical embodiment 1.
Figure 3:
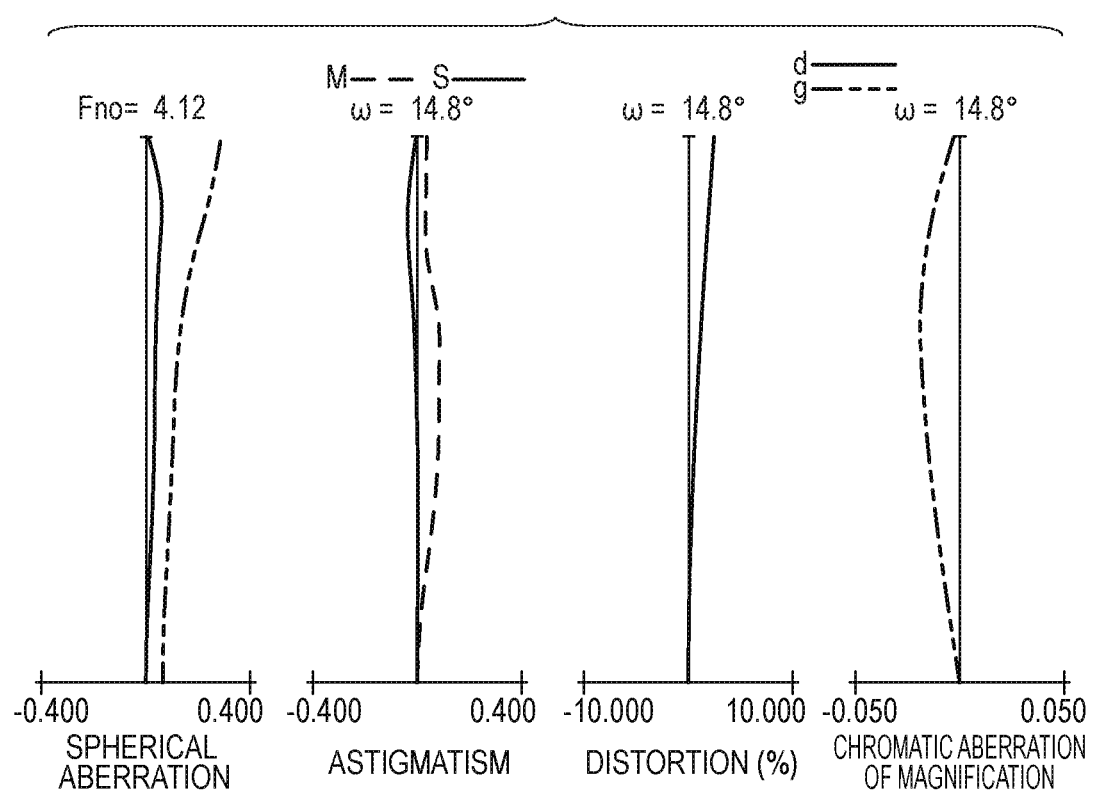
FIG. 3 illustrates aberration diagrams at a middle focal length of the numerical embodiment 1.
Figure 4:
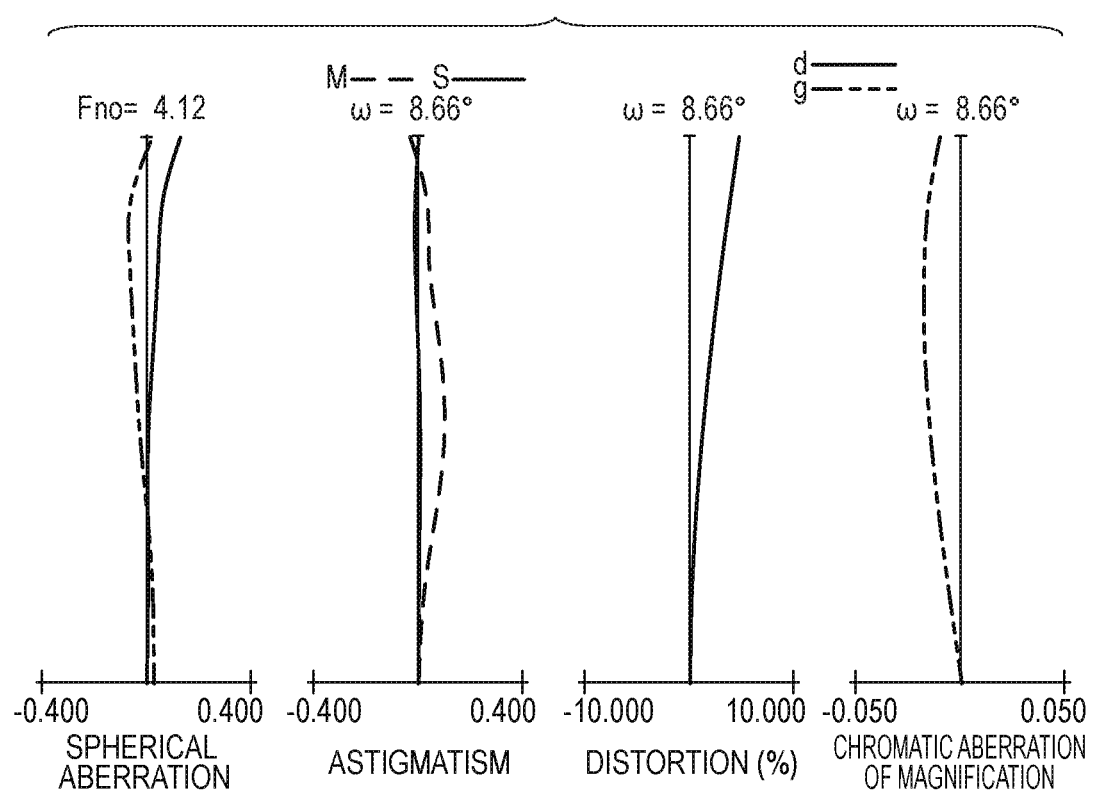
FIG. 4 illustrates aberration diagrams at a telephoto end of the numerical embodiment 1.
Figure 5:
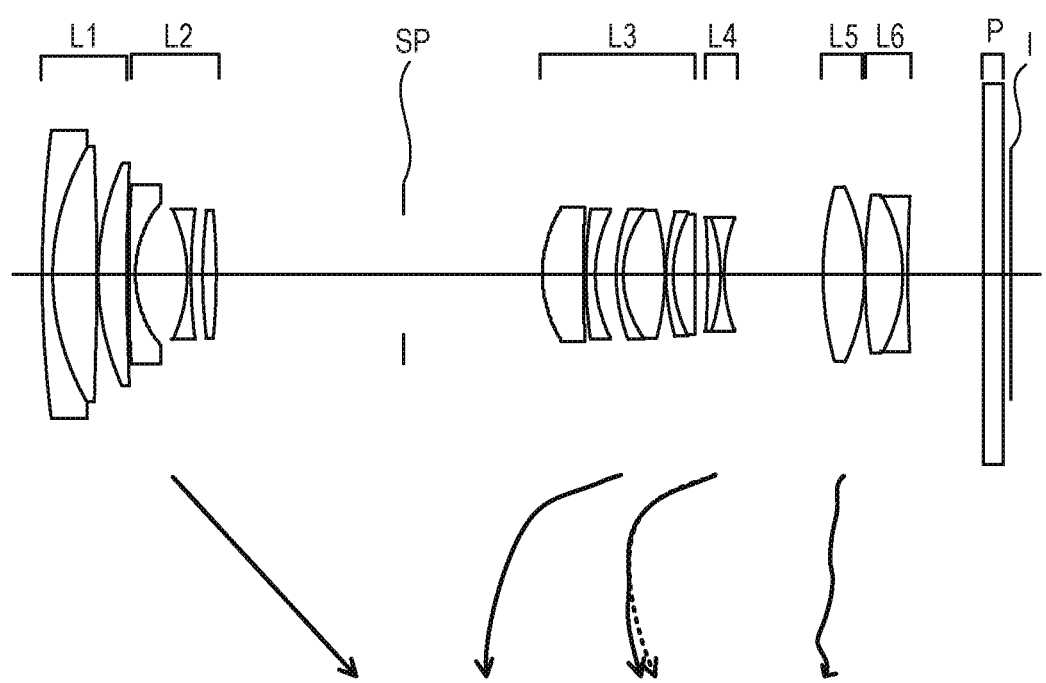
FIG. 5 is a cross-sectional view of lenses in an optical system of a numerical embodiment 2.
Figure 6:
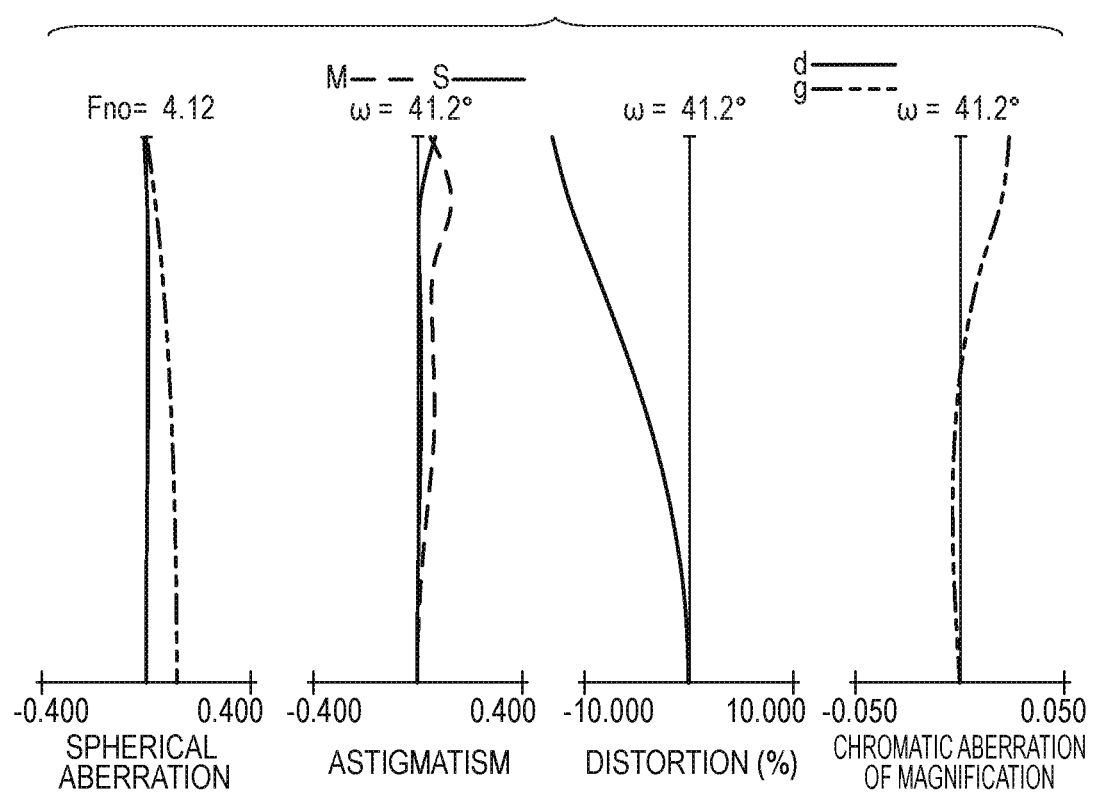
FIG. 6 illustrates aberration diagrams at the wide angle end of the numerical embodiment 2.
Figure 7:
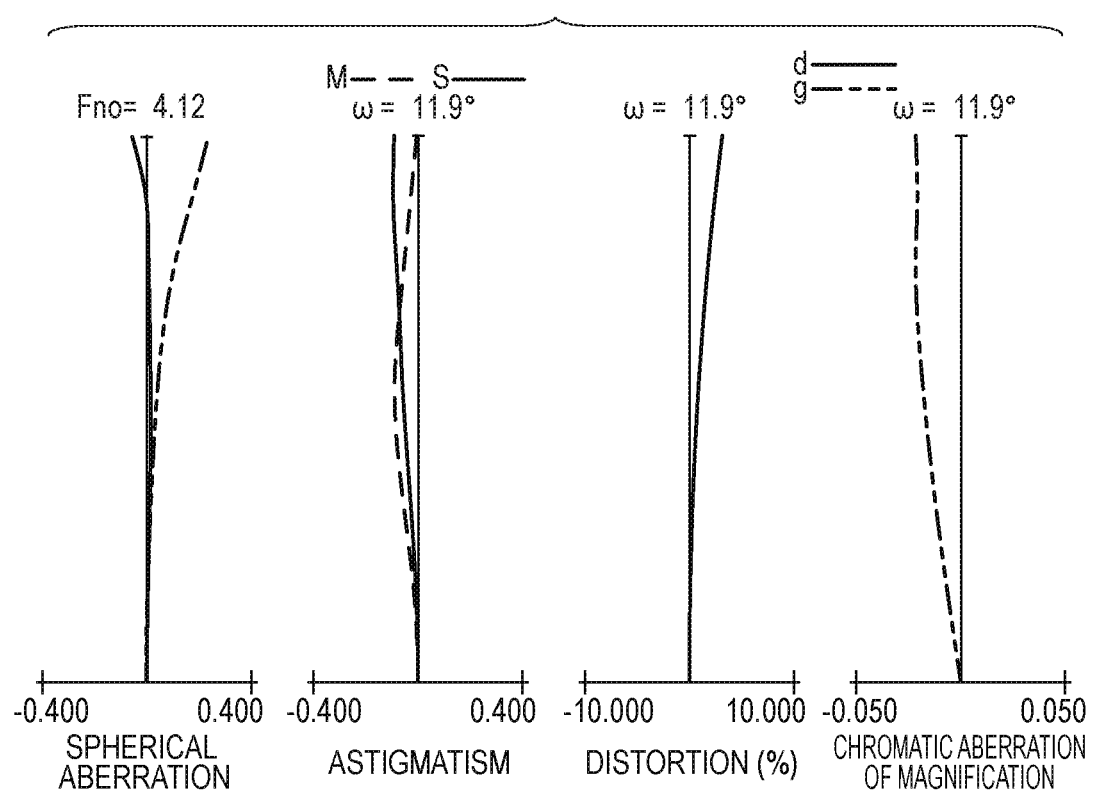
FIG. 7 illustrates aberration diagrams at the middle focal length of the numerical embodiment 2.
Figure 8:
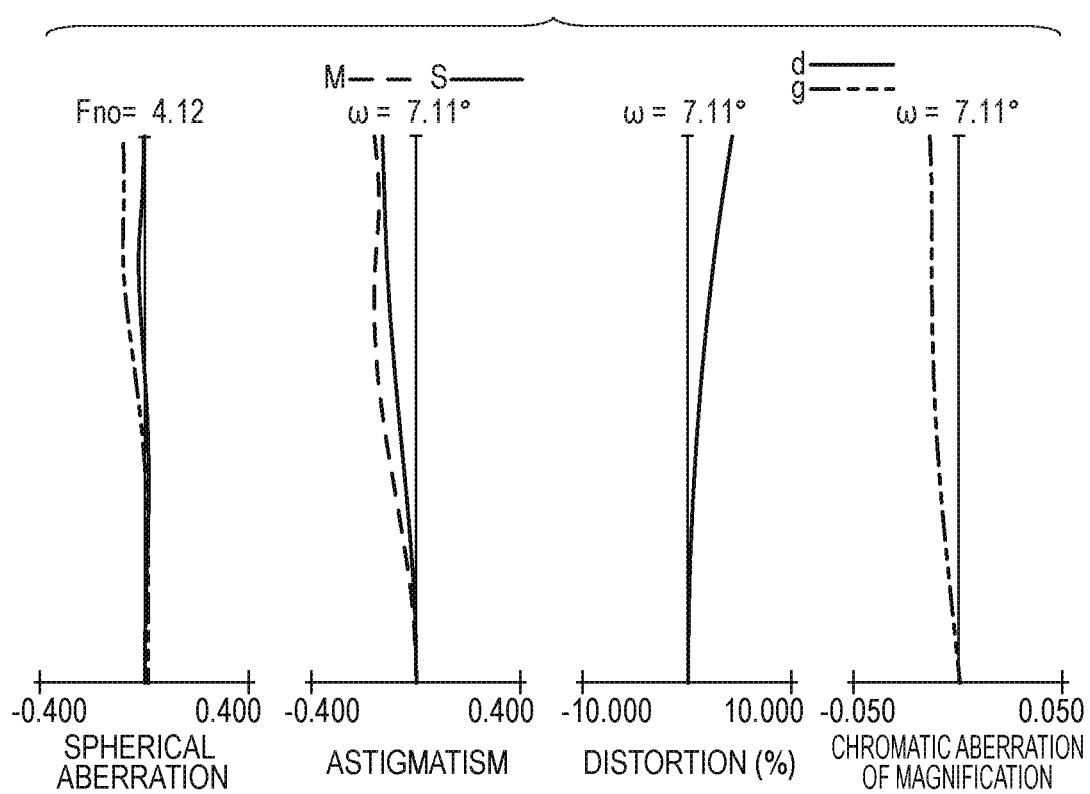
FIG. 8 illustrates aberration diagrams at the telephoto end of the numerical embodiment 2.
Figure 9:
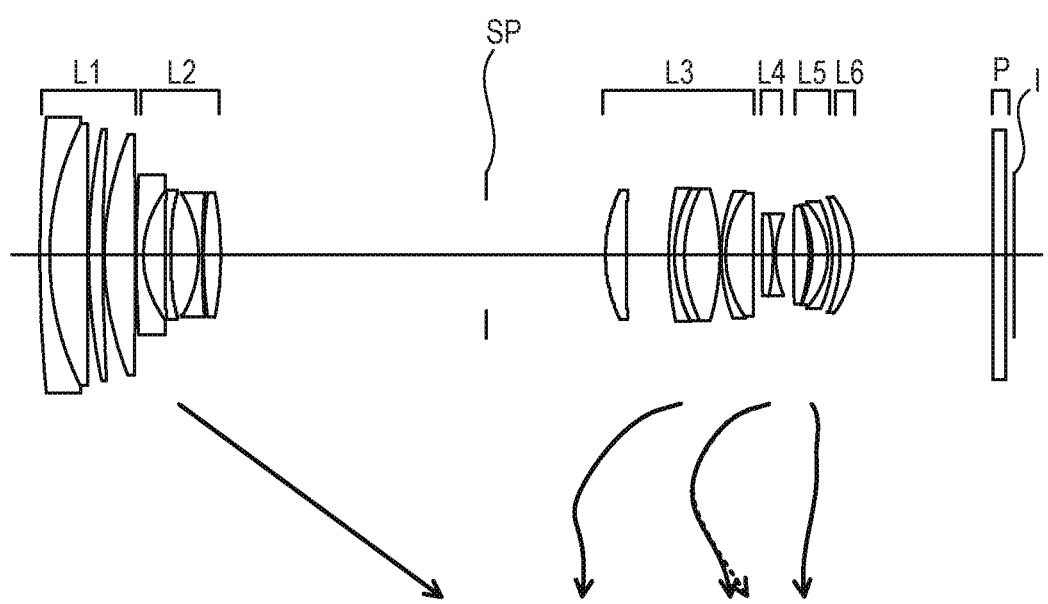
FIG. 9 is a cross-sectional view of lenses in an optical system of a numerical embodiment 3.
Figure 10:
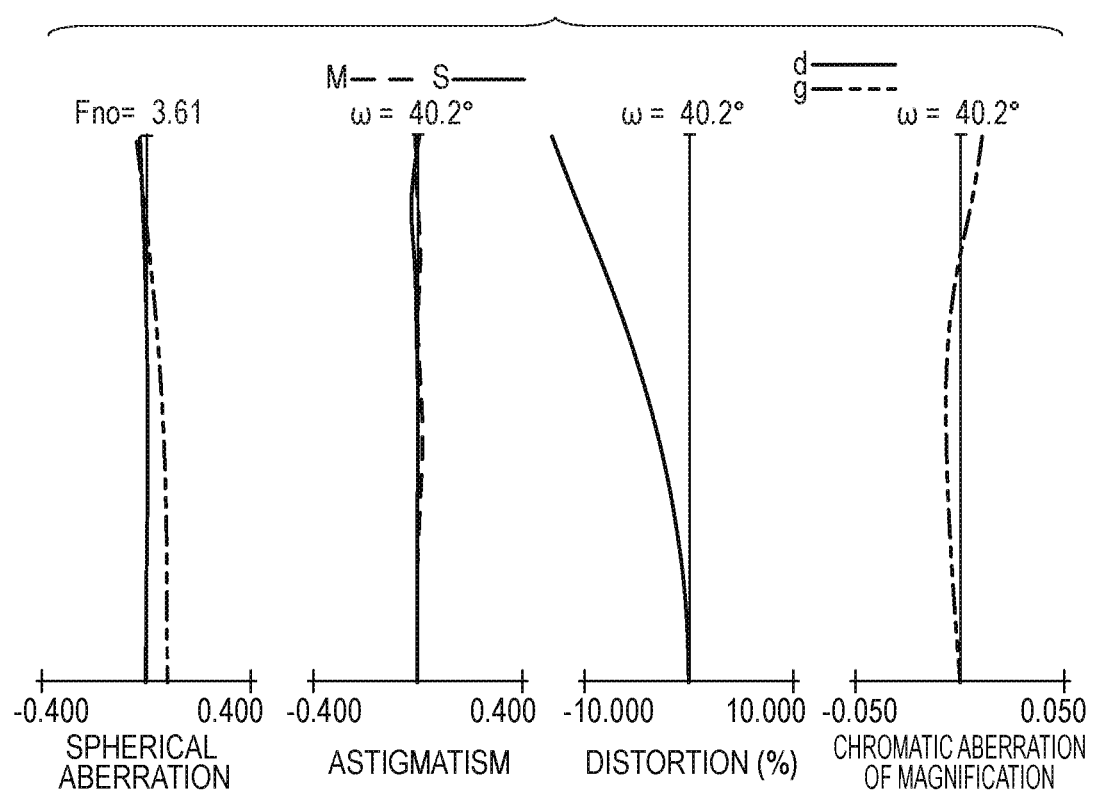
FIG. 10 illustrates aberration diagrams at the wide angle end of the numerical embodiment 3.
Figure 11:
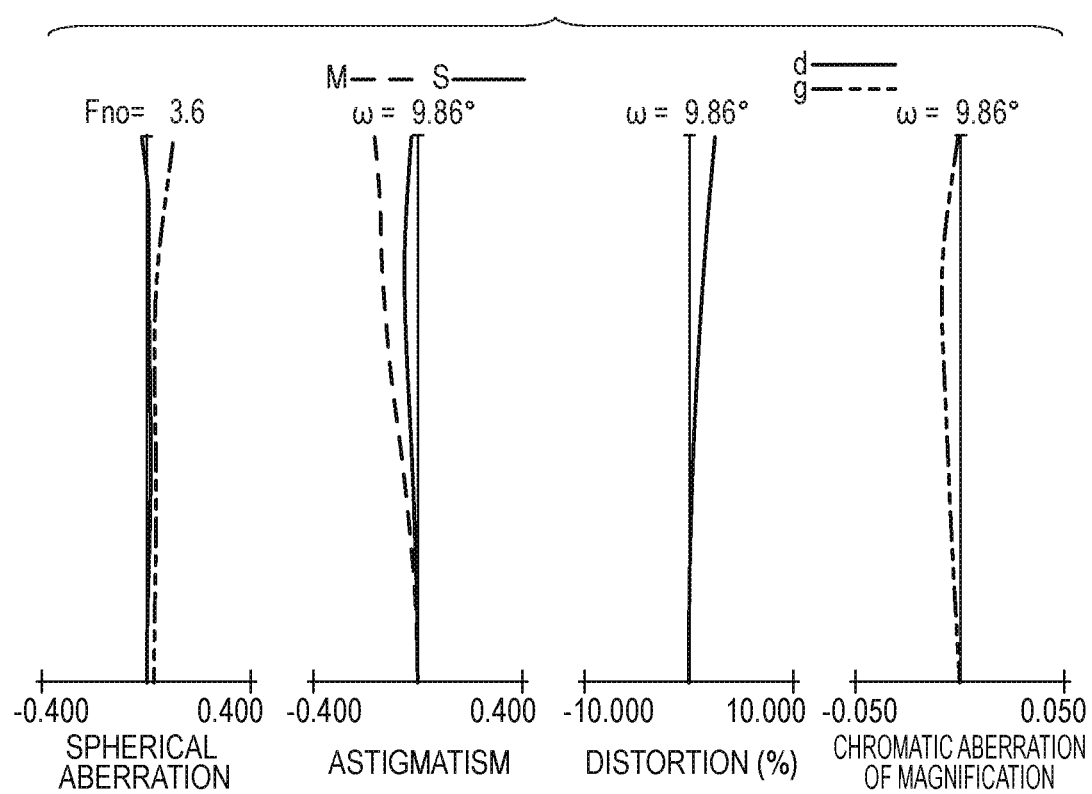
FIG. 11 illustrates aberration diagrams at the middle focal length of the numerical embodiment 3.
Figure 12:
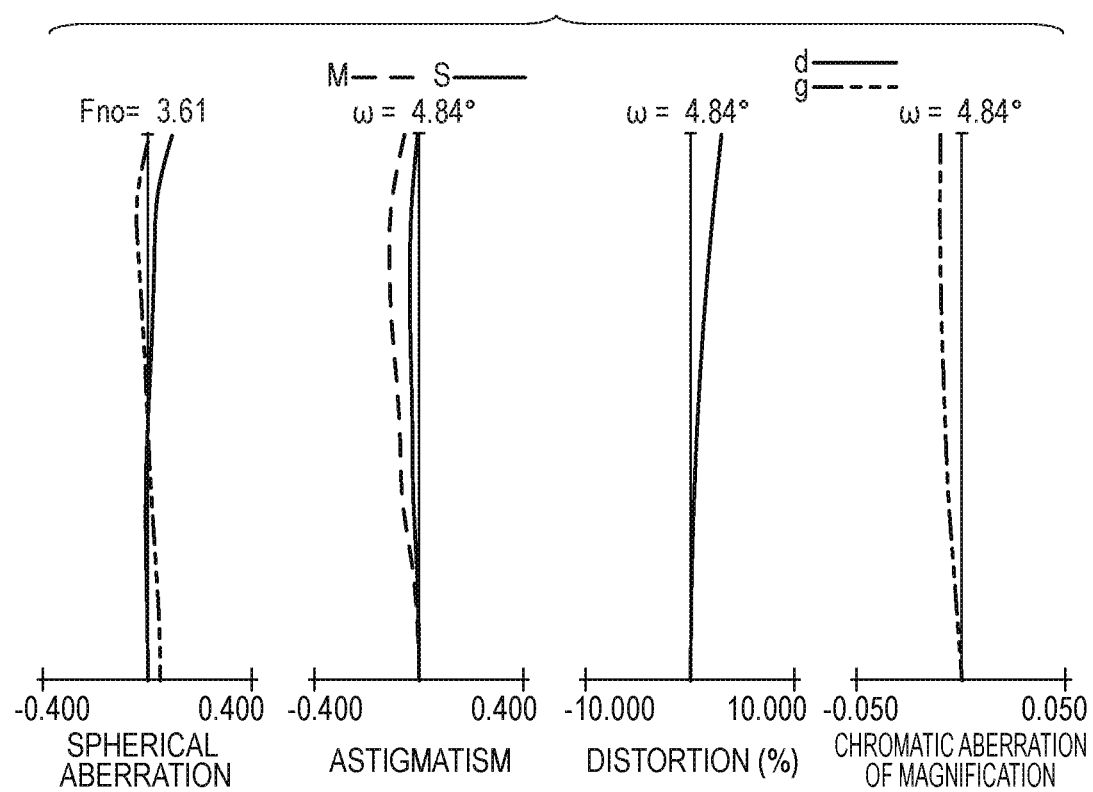
FIG. 12 illustrates aberration diagrams at the telephoto end of the numerical embodiment 3.
Figure 13:
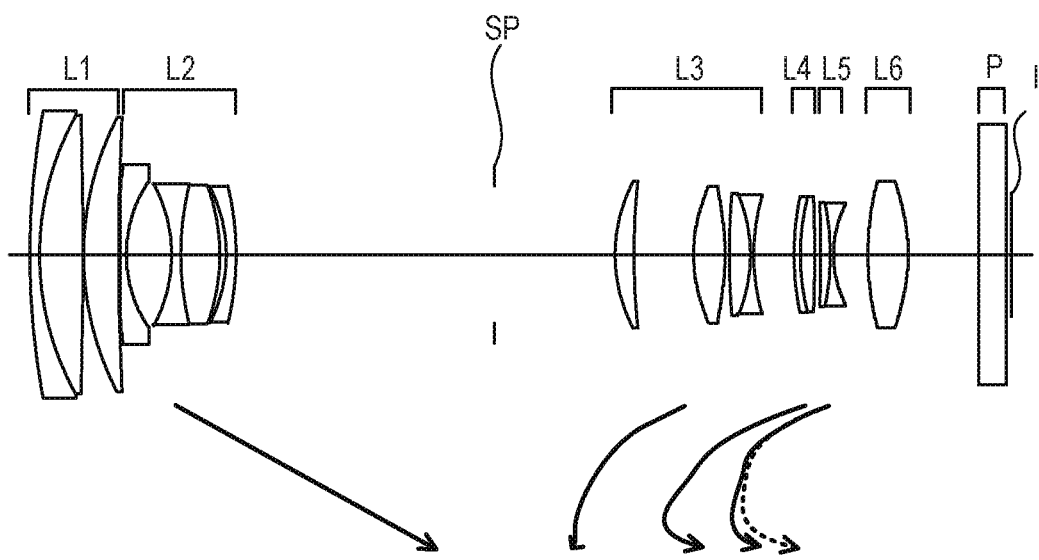
FIG. 13 is a cross-sectional view of lenses in an optical system of a numerical embodiment 4.
Figure 14:
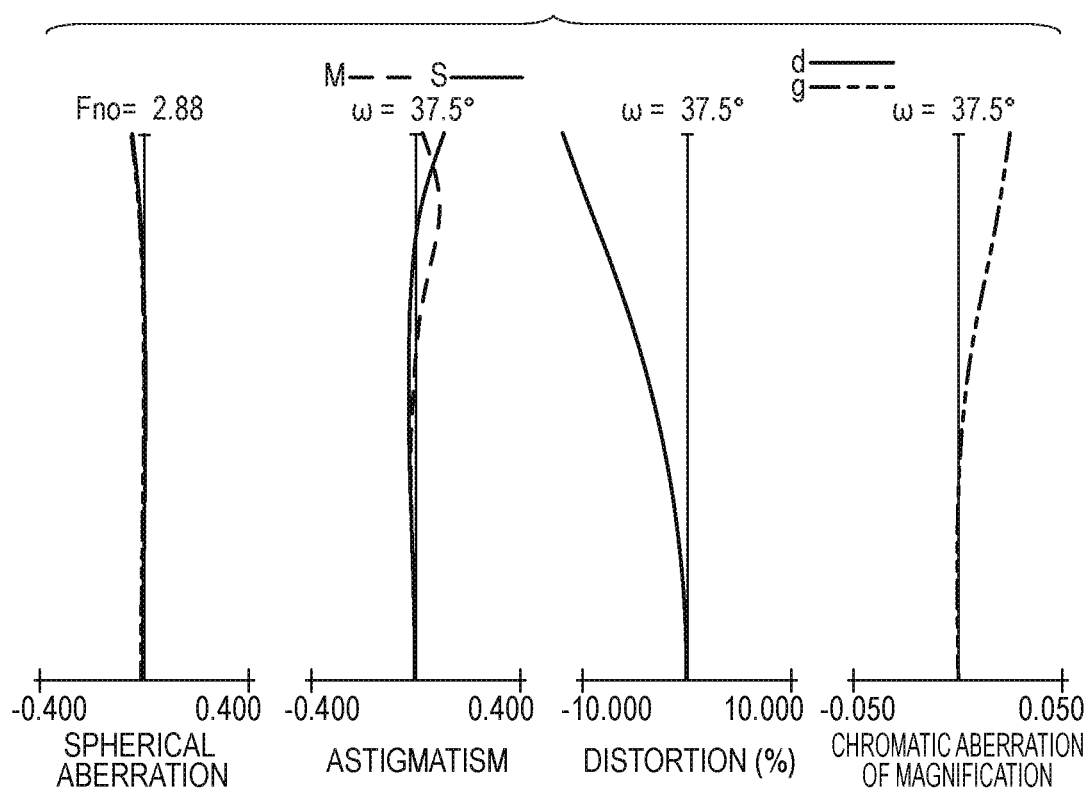
FIG. 14 illustrates aberration diagrams at the wide angle end of the numerical embodiment 4.
Figure 15:
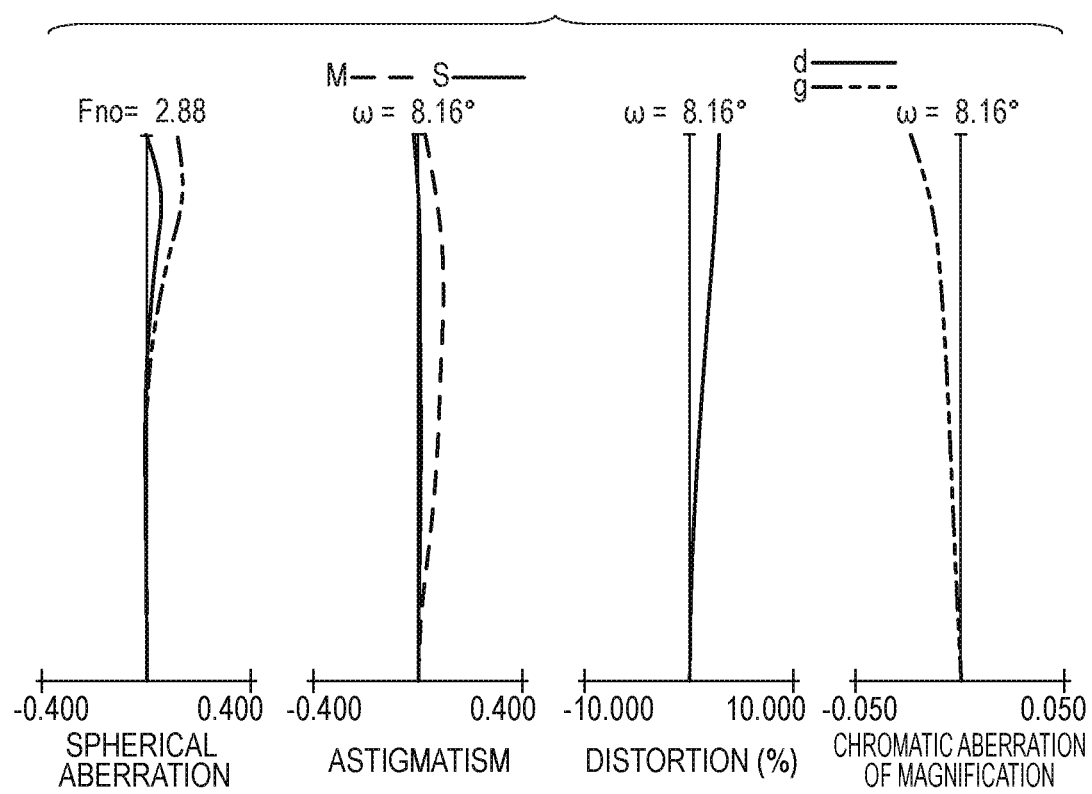
FIG. 15 illustrates aberration diagrams at the middle focal length of the numerical embodiment 4.
Figure 16:
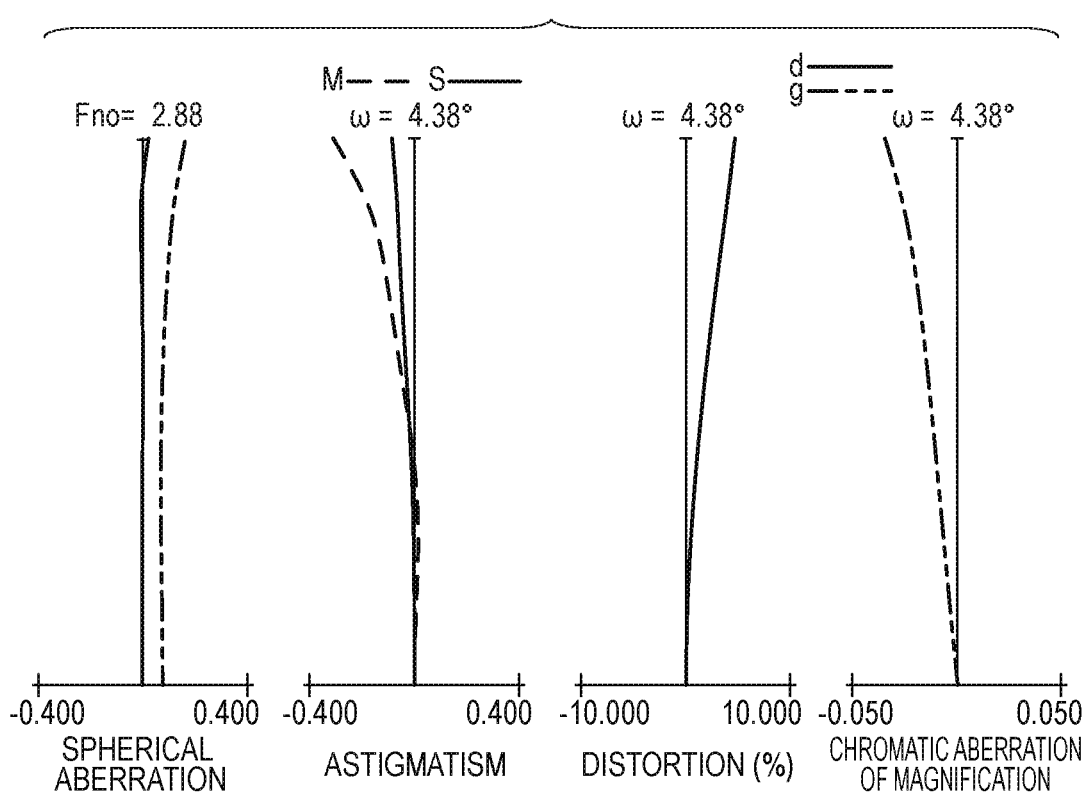
FIG. 16 illustrates aberration diagrams at the telephoto end of the numerical embodiment 4.

A zoom lens of the disclosure includes a first lens unit having a positive refractive power, a second lens unit having a negative refractive power, an intermediate lens group having a positive refractive power and including one or two lens units inclusive of a third lens unit located on an object side, a lens unit having a negative refractive power, and a rear lens group including one or two lens units inclusive of a lens unit which is located on the object side and has a positive refractive power, which are arranged in order from the object side to an image side. Here, an interval between every two adjacent lens units is configured to be variable for zooming. In the meantime, a total length of the zoom lens is reduced by keeping the first lens unit unmoved relative to an image plane while varying the intervals between the lens units during the zooming. The first lens unit includes three or more lenses and mainly corrects a spherical aberration and an axial chromatic aberration on a telephoto side. The second lens unit includes three or more lenses and mainly suppresses variations in curvature of field and in chromatic aberration of magnification during the zooming. In order to achieve correction of aberrations and reduction in size at the same time, it is preferable to form each of the first lens unit and the second lens unit by use of three or four lenses.

In addition, the zoom lens satisfies the following conditional expressions:

$$-10 < m2/m3 < -0.5 \quad (1);$$

$$2.0 < L3w/fw < 8.7 \quad (2);$$

$$27.0 < v1 < 45.0 \quad (3); \text{ and}$$

$$-0.4 < f2/ft < -0.1 \quad (4),$$

where m2 is an amount of movement of the second lens unit from a wide angle end to a telephoto end, and m3 is an amount of movement of the third lens unit from the wide angle end to the telephoto end. Each of m2 and m3 takes on a positive value when the corresponding lens unit is located on the image side at the telephoto end relative to a case at the wide angle end. Meanwhile, L3w is a distance at the wide angle end from a vertex of a lens surface on the object side of the first lens unit to a vertex of a lens surface on the object side of the third lens unit at the wide angle end, fw is a focal length, v1 is an Abbe number of the lens located closest to the object side in the first lens unit, f2 is a focal length of the second lens unit, and ft is a focal length at the telephoto end.

The conditional expression (1) is an expression that defines a ratio between the amounts of the movement from the wide angle end to the telephoto end of the second lens unit and the third lens unit. If this ratio exceeds the upper limit of the conditional expression (1), it is difficult to correct variations in curvature of field and in chromatic aberration of magnification during the zooming because the amount of movement of the second lens unit is too small and the refractive power of the second lens unit is too strong for securing a desired zoom ratio. On the other hand, if the ratio falls below the lower limit of the conditional expression (1), it is difficult to achieve both a wide range and reduction in diameter of a front lens unit because an entrance pupil is too far.

The conditional expression (2) is an expression that defines a ratio between the distance from the vertex of the lens on the object side of the first lens unit to the vertex of the lens on the object side of the third lens unit at the wide angle end and the focal length at the wide angle end. If this ratio exceeds the upper limit of the conditional expression (2), the diameter of the third lens unit becomes too large, which is not desirable. On the other hand, if the ratio falls below the lower limit of the conditional expression (2), it is difficult to correct the variation in curvature of field during the zooming and the spherical aberration at the telephoto end because the refractive powers of the second lens unit and the third lens unit are too strong for securing the desired zoom ratio.

The conditional expression (3) is an expression that defines the Abbe number of the lens located closest to the object side in the first lens unit. An image pickup lens has to conduct achromatization at various wavelengths within a visible range. If this Abbe number exceeds the upper limit of the conditional expression (3), it is difficult to correct the spherical aberration at the telephoto end in particular because the refractive powers of the lenses having the positive refractive power and of the lenses having the negative refractive power are too strong for conducting the achromatization. On the other hand, if the Abbe number falls below the lower limit of the conditional expression (3), the achromatization on a short wavelength side is prone to be excessive because a glass material with a small Abbe number tends to exhibit large dispersion on the short wavelength side.

The conditional expression (4) is an expression that defines a ratio between the focal length of the second lens unit and the focal length at the telephoto end. If this ratio exceeds the upper limit of the conditional expression (4), it is difficult to correct the variation in curvature of field during the zooming and the spherical aberration at the telephoto end because the refractive power of the second lens unit is too strong. On the other hand, if the ratio falls below the lower limit of the conditional expression (4), the total length of the zoom lens becomes too long for securing the desired zoom ratio, which is not desirable.

The object of the aspect of the embodiments is attained by satisfying the above-described conditional expressions. Nevertheless, one aspect of the embodiments also satisfies the following conditional expression:

$$3 < ft/fw < 10 \quad (5).$$

The conditional expression (5) is an expression that defines a ratio between the focal length at the telephoto end and the focal length at the wide angle end. If this ratio exceeds the upper limit of the conditional expression (5), it is difficult to achieve good optical properties with a small size. On the other hand, if the ratio falls below the lower limit of the conditional expression (5), it is possible to achieve good optical properties with a small size without applying the aspect of the embodiments.

Meanwhile, one aspect of the embodiments satisfies the following conditional expression:

$$0.5 < D1/fw < 1.7 \quad (6),$$

where D1 is a thickness on an optical axis of the first lens unit.

The conditional expression (6) is an expression that defines a ratio between the thickness on the optical axis of the first lens unit and the focal length at the wide angle end. If this ratio exceeds the upper limit of the conditional expression (6), the diameter of the front lens unit becomes larger in the case of the wide angle, which is not desirable. On the other hand, if the ratio falls below the lower limit of the conditional expression (6), the wide angle is not obtained and this situation defeats the purpose of the aspect of the embodiments.

Meanwhile, an aspect of the embodiments also satisfies the following conditional expression:

$$0.17 < D1/f1 < 0.28 \tag{7},$$

where f1 is a focal length of the first lens unit.

The conditional expression (7) is an expression that defines a ratio between the thickness on the optical axis of the first lens unit and the focal length of the first lens unit. If this ratio exceeds the upper limit of the conditional expression (7), it is difficult to correct the spherical aberration and the axial chromatic aberration at the telephoto end when the diameter of the front lens unit becomes larger or when the refractive force of the first lens unit becomes stronger. On the other hand, if the ratio falls below the lower limit of the conditional expression (7), a telephoto ratio at the telephoto end becomes larger whereby the total length of the zoom lens becomes too long, which is not desirable.

Meanwhile, an aspect of the embodiments also satisfies the following conditional expression:

$$-1.6 < m3/fw < -0.55 \tag{8}.$$

The conditional expression (8) is an expression that defines a ratio between the amount of movement of the third lens unit from the wide angle end to the telephoto end and the focal length at the wide angle end. If this ratio exceeds the upper limit of the conditional expression (8), the diameter of the front lens unit becomes too large at the wide angle, which is not desirable. On the other hand, if the ratio falls below the lower limit of the conditional expression (8), the diameter of the third lens unit becomes too large, which is not desirable.

Meanwhile, an aspect of the embodiments also satisfies the following conditional expression:

$$-1.5 < f2/fw < -0.6 \tag{9},$$

where f2 is the focal length of the second lens unit.

If this ratio exceeds the upper limit of the conditional expression (9), it is difficult to correct the curvature of field and the chromatic aberration of magnification at the wide angle end in particular in the case of setting at the wide angle. On the other hand, if the ratio falls below the lower limit of the conditional expression (9), the total length of the zoom lens becomes too long for securing the desired zoom ratio, which is not desirable.

Meanwhile, an aspect of the embodiments also satisfies the following conditional expression:

$$65 < v2 < 98 \tag{10},$$

where v2 is an Abbe number of the lens located second closest to the object side in the first lens unit.

The conditional expression (10) is an expression that defines the Abbe number of the lens located second closest to the object side in the first lens unit. Note that the lenses located first and second closest to the object side in the first lens unit conduct the achromatization. If this Abbe number exceeds the upper limit of the conditional expression (10), it is difficult to select an appropriate glass material. On the other hand, if the Abbe number falls below the lower limit of the conditional expression (10), it is difficult to correct the axial chromatic aberration at the telephoto end in particular.

Meanwhile, an aspect of the embodiments also satisfies the following conditional expression:

$$0.25 < L23w/TDw < 0.45 \tag{11},$$

where L23w is a distance from a vertex of a lens on the image side of the second lens unit to the vertex of the lens on the object side of the third lens unit at the wide angle end, and TDw is a total optical track at the wide angle end. This total optical track is obtained by adding a back focus to a total length of the zoom lens. If there is a glass block or the like in the back focus, then the back focus extended by the glass block or the like is also added to the total optical track.

The conditional expression (11) is an expression that defines a ratio between the distance from the vertex of the lens on the image side of the second lens unit to the vertex of the lens on the object side of the third lens unit at the wide angle end and the total optical track at the wide angle end. If this ratio exceeds the upper limit of the conditional expression (11), it is difficult to achieve both the reduction in diameter of the front lens unit and the setting of the wide angle because the entrance pupil is too far. On the other hand, if the ratio falls below the lower limit of the conditional expression (11), it is difficult to correct the variations in curvature of field and in chromatic aberration of magnification during the zooming because the refractive power of the second lens unit is too strong for securing the desired zoom ratio.

Meanwhile, an aspect of the embodiments also satisfies the following conditional expression:

$$0.5 < f2/fn2 < 1.0 \tag{12},$$

where fn2 is a focal length of a lens unit located closest to the object side out of the lens units having the negative refractive power and being arranged closer to the image side than the third lens unit.

The conditional expression (12) is an expression that defines a ratio between the focal length of the second lens unit and the focal length of the lens unit located closest to the object side out of the lens units having the negative refractive power and being arranged closer to the image side than the third lens unit. If this ratio exceeds the upper limit of the conditional expression (12), it is difficult to correct a positive distortion at the telephoto end. On the other hand, if the ratio falls below the lower limit of the conditional expression (12), it is difficult to correct the variations in curvature of field and in chromatic aberration of magnification during the zooming.

In one embodiment, the ranges of the numerical values in the conditional expressions (1) to (12) are specified as follows:

$$-3.1 < m2/m3 < -1.2 \tag{1a};$$

$$2.5 < L3w/fw < 8.7 \tag{2a};$$

$$27.5 < v1 < 45.0 \tag{3a};$$

$$-0.2 < f2/ft < -0.1 \tag{4a};$$

$$4.5 < ft/fw < 10.0 \tag{5a};$$

$$0.53 < D1/fw < 1.47 \tag{6a};$$

$$0.18 < D1/f1 < 0.23 \tag{7a};$$

$$-1.52 < m3/fw < -0.63 \tag{8a};$$

$$-1.47 < f2/fw < -0.68 \tag{9a};$$

$$66 < v2 < 98 \tag{10a};$$

$$0.27 < L23w/TDw < 0.42 \tag{11a}; \text{ and}$$

$$0.58 < f2/fn2 < 0.93 \tag{12a}.$$

Embodiments of the disclosure will be described below in detail based on the accompanying drawings.

FIGS. 1, 5, 9, and 13 are cross-sectional views of lenses in the numerical embodiments 1 to 4 to be described later. Meanwhile, FIGS. 2 to 4, 6 to 8, 10 to 12, and 14 to 16 are aberration diagrams of the respective numerical embodiments. Among FIGS. 2 to 4, 6 to 8, 10 to 12, and 14 to 16, FIGS. 2, 6, 10, and 14 are aberration diagrams at the wide angle end, FIGS. 3, 7, 11, and 15 are aberration diagrams at a middle focal length, and FIGS. 4, 8, 12, and 16 are aberration diagrams at the telephoto end. In the aberration diagrams, d and g represent the d-line and the g-line, M and S represent a meridional image plane and a sagittal image plane, respectively. The chromatic aberrations of magnification are depicted by using the g-line.

In the cross-sectional views of lenses in FIGS. 1, 5, 9, and 13, L1 to L6 represent first to sixth lens units, SP represents a stop, P represents a glass block such as a CCD face plate and a low-pass filter, and I represents an image plane. In this embodiment, the lens units are moved as indicated with arrows in FIGS. 1, 5, 9, and 13 during the zooming from the wide angle end to the telephoto end. Arrows in solid lines and an arrow in a dashed line represent movement loci for correction of image plane variations associated with the zooming when focusing on an infinite distance object and when focusing on a short distance object, respectively.

First Embodiment

A zoom lens of a first embodiment includes a first lens unit L1 having a positive refractive power and configured not to move for zooming, a second lens unit L2 having a negative refractive power, a third lens unit L3 having a positive refractive power, a fourth lens unit L4 having a negative refractive power, and a fifth lens unit L5 having a positive refractive power and configured not to move for the zooming, which are arranged in order from the object side to the image side. In the first embodiment, the intermediate lens group is formed from the third lens unit L3, and the rear lens group is formed from the fifth lens unit L5. The first lens unit includes three lenses and the second lens unit L2 includes four lenses.

During the zooming from the wide angle end to the telephoto end, the second lens unit L2 moves to the image side, the third lens unit L3 moves monotonously to the object side, and the fourth lens unit L4 moves along a locus convex to the object side. The fourth lens unit L4 moves to the image side to transition from focusing on the infinite distance object to focusing on the short distance object.

As shown in Table 1, the zoom lens of the first embodiment satisfies the conditional expressions (1) to (12), thus realizing the zoom lens which achieves a small size, a wide angle, a large magnification, and good optical properties including correction of a chromatic aberration among others.

Second Embodiment

A zoom lens of a second embodiment includes a first lens unit L1 having a positive refractive power and configured not to move for zooming, a second lens unit L2 having a negative refractive power, a third lens unit L3 having a positive refractive power, a fourth lens unit L4 having a negative refractive power, a fifth lens unit L5 having a positive refractive power, and a sixth lens unit L6 having a negative refractive power and configured not to move for the zooming, which are arranged in order from the object side to the image side. In the second embodiment, the intermediate lens group is formed from the third lens unit L3, and the rear lens group is formed from the fifth lens unit L5 and the sixth lens unit L6. The first lens unit L1 includes three lenses and the second lens unit L2 includes three lenses.

During the zooming from the wide angle end to the telephoto end, the second lens unit L2 moves to the image side, the third lens unit L3 moves non-monotonously to the object side, and the fourth lens unit L4 moves along a locus convex to the object side. The fourth lens unit L4 moves to the image side to transition from focusing on the infinite distance object to focusing on the short distance object. The fifth lens unit L5 moves during the zooming.

As shown in Table 1, the zoom lens of the second embodiment satisfies the conditional expressions (1) to (12), thus realizing the zoom lens which achieves a small size, a wide angle, a large magnification, and good optical properties including correction of a chromatic aberration among others.

Third Embodiment

A zoom lens of a third embodiment includes a first lens unit L1 having a positive refractive power and configured not to move for zooming, a second lens unit L2 having a negative refractive power, a third lens unit L3 having a positive refractive power, a fourth lens unit L4 having a negative refractive power, a fifth lens unit L5 having a positive refractive power, and a sixth lens unit L6 having a positive refractive power and configured not to move for the zooming, which are arranged in order from the object side to the image side. In the third embodiment, the intermediate lens group is formed from the third lens unit L3, and the rear lens group is formed from the fifth lens unit L5 and the sixth lens unit L6. The first lens unit L1 includes four lenses and the second lens unit L2 includes four lenses.

During the zooming from the wide angle end to the telephoto end, the second lens unit L2 moves to the image side, the third lens unit L3 moves non-monotonously to the object side, and the fourth lens unit L4 moves along a locus convex to the object side. The fourth lens unit L4 moves to the image side to transition from focusing on the infinite distance object to focusing on the short distance object. The fifth lens unit L5 moves during the zooming.

As shown in Table 1, the zoom lens of the third embodiment satisfies the conditional expressions (1) to (12), thus realizing the zoom lens which achieves a small size, a wide angle, a large magnification, and good optical properties including correction of a chromatic aberration among others.

Fourth Embodiment

A zoom lens of a fourth embodiment includes a first lens unit L1 having a positive refractive power and configured not to move for zooming, a second lens unit L2 having a negative refractive power, a third lens unit L3 having a positive refractive power, a fourth lens unit L4 having a positive refractive power, a fifth lens unit L5 having a negative refractive power, and a sixth lens unit L6 having a positive refractive power and configured not to move for the zooming, which are arranged in order from the object side to the image side. In the fourth embodiment, the intermediate lens group is formed from the third lens unit L3 and the fourth lens unit L4, and the rear lens group is formed from the sixth lens unit L6. The first lens unit includes three lenses and the second lens unit L2 includes four lenses.

During the zooming from the wide angle end to the telephoto end, the second lens unit L2 moves to the image side, the third lens unit L3 moves non-monotonously to the object side, and the fourth lens unit L4 and the fifth lens unit L5 each move along locus convex to the object side. The fifth lens unit L5 moves to the image side to transition from focusing on the infinite distance object to focusing on the short distance object.

As shown in Table 1, the zoom lens of the fourth embodiment satisfies the conditional expressions (1) to (12), thus realizing the zoom lens which achieves a small size, a wide angle, a large magnification, and good optical properties including correction of a chromatic aberration among others.

Numerical embodiments of the disclosure are described below.

In each numerical embodiment, ri denotes a curvature radius of an i-th plane counted from the object side, di denotes an interval (either a lens thickness or an air interval) between the i-th plane and an i+1-th plane, and ndi and vdi denote a refractive index and the Abbe number of a medium existing between the i-th plane and the i+1-th plane, respectively.

Assuming that an X axis is in a direction of the optical axis, an h axis is in a perpendicular direction to the optical axis, a traveling direction of the light is positive, R is a paraxial radius of curvature, and k, A4, A6, A8, and A10 are aspheric coefficients, respectively, an aspheric surface shape is expressed by the following formula:

$$X = \frac{(1/R)h^2}{1 + \sqrt{1 - (1+k)(h/R)^2}} + A4h^4 + A6h^6 + A8h^8 + A10h^{10}.$$

In the meantime, a remark "e-Z", for instance, represents "$\times 10^{-Z}$". Each half angle of view is obtained by means of ray tracing. Meanwhile, BF represents the back focus.

Numerical Value Embodiment 1

| [Unit mm] | | | | |
|---|---|---|---|---|
| Surface data | | | | |
| Surface number | r | d | nd | vd |
| 1 | 211.327 | 1.98 | 1.80000 | 29.8 |
| 2 | 68.684 | 8.92 | 1.53775 | 74.7 |
| 3 | −173.418 | 0.20 | | |
| 4 | 45.678 | 5.11 | 1.60311 | 60.6 |
| 5 | 192.413 | (variable) | | |
| 6 | 933.115 | 1.15 | 1.83481 | 42.7 |
| 7 | 24.144 | 4.38 | | |
| 8* | 198.015 | 0.98 | 1.58313 | 59.5 |
| 9* | 58.478 | 4.04 | | |
| 10 | −29.386 | 0.92 | 1.53775 | 74.7 |
| 11 | 252.000 | 0.20 | | |
| 12 | 76.644 | 2.37 | 1.95906 | 17.5 |
| 13 | −369.223 | (variable) | | |
| 14(stop) | ∞ | (variable) | | |
| 15* | 27.994 | 4.86 | 1.58313 | 59.4 |
| 16* | 1567.023 | 5.04 | | |
| 17 | 77.433 | 2.00 | 1.80518 | 25.4 |
| 18 | 28.319 | 0.82 | | |
| 19 | 36.828 | 5.95 | 1.49700 | 81.5 |
| 20 | −46.615 | 4.72 | | |
| 21 | 39.766 | 1.12 | 1.85896 | 22.7 |
| 22 | 31.064 | 4.88 | 1.55332 | 71.7 |
| 23* | −168.214 | (variable) | | |
| 24 | −548.321 | 3.20 | 1.95906 | 17.5 |
| 25 | −38.200 | 0.92 | 1.85135 | 40.1 |
| 26* | 28.212 | (variable) | | |
| 27* | 77.214 | 7.01 | 1.49700 | 81.5 |

-continued

| [Unit mm] | | | | |
|---|---|---|---|---|
| 28* | −45.551 | 1.56 | | |
| 29 | −115.332 | 6.61 | 1.48749 | 70.2 |
| 30 | −25.286 | 1.28 | 1.89190 | 37.1 |
| 31 | −97.474 | (variable) | | |
| 32 | ∞ | 5.00 | 1.51633 | 64.1 |
| 33 | ∞ | 2.00 | | |
| Image plane | ∞ | | | |

Aspheric surface data

8th surface

K = −1.14606e+003
A4 = −1.02976e−005
A6 = −2.22596e−008
A8 = 1.26231e−010

9th surface

K = −6.20313e+001
A4 = 1.14241e−005
A6 = −1.02917e−007
A8 = 3.59303e−010

15th surface

K = −3.71847e+000
A4 = 1.79718e−005
A6 = −1.59768e−008
A8 = 3.34977e−011

16th surface

K = 8.84837e+003
A4 = 5.91108e−006
A6 = 4.03205e−009
A8 = −3.38122e−012

23h surface

K = −1.35747e+002
A4 = −2.15076e−006
A6 = 6.31244e−009
A8 = −6.12543e−012

26th surface

K = 6.01659e−001
A4 = −6.89564e−007
A6 = −5.07807e−009
A8 = −2.89983e−011

27th surface

K = 9.82181e+000
A4 = 3.98290e−006
A6 = −7.92793e−009
A8 = 1.13422e−011

28th surface

K = −9.80478e−001
A4 = 8.99386e−007
A6 = −1.32904e−008
A8 = 2.27873e−011

| Various data Zoom ratio 4.71 | | | |
|---|---|---|---|
| | Wide angle | Middle | Telephoto |
| Focal length | 28.84 | 80.09 | 135.75 |
| F-number | 4.12 | 4.12 | 4.12 |
| Half angle of view (deg) | 33.13 | 15.12 | 9.06 |
| Image height | 18.82 | 21.64 | 21.64 |
| Total lens length | 167.97 | 167.97 | 167.97 |
| BF | 27.78 | 27.78 | 27.78 |
| d5 | 1.29 | 16.93 | 27.36 |
| d13 | 27.49 | 11.85 | 1.42 |
| d14 | 20.53 | 3.20 | 1.48 |
| d23 | 2.22 | 9.89 | 13.20 |
| d26 | 8.43 | 18.09 | 16.51 |
| d31 | 22.49 | 22.49 | 22.49 |

[Unit mm]

Zoom lens unit data

| Unit | Start surface | Focal length |
|---|---|---|
| 1 | 1 | 75.44 |
| 2 | 6 | −20.78 |
| 3 | 15 | 29.53 |
| 4 | 24 | −34.28 |
| 5 | 27 | 143.27 |

Numerical Value Embodiment 2

[Unit mm]

Surface data

| Surface number | r | d | nd | vd |
|---|---|---|---|---|
| 1 | 276.814 | 2.52 | 1.91082 | 35.3 |
| 2 | 62.102 | 11.07 | 1.59522 | 67.7 |
| 3 | −765.084 | 0.20 | | |
| 4 | 65.832 | 6.95 | 1.77250 | 49.6 |
| 5 | 601.398 | (variable) | | |
| 6* | 745.229 | 1.61 | 1.88202 | 37.2 |
| 7* | 28.425 | 12.46 | | |
| 8 | −37.137 | 1.20 | 1.69680 | 55.5 |
| 9 | 119.599 | 2.72 | | |
| 10 | 116.477 | 3.20 | 2.00272 | 19.3 |
| 11 | −155.767 | (variable) | | |
| 12(stop) | ∞ | (variable) | | |
| 13* | 30.634 | 10.17 | 1.58313 | 59.4 |
| 14* | ∞ | 0.43 | | |
| 15 | 109.370 | 2.48 | 1.59522 | 67.7 |
| 16 | 34.120 | 5.12 | | |
| 17 | 44.243 | 1.66 | 1.85478 | 24.8 |
| 18 | 25.908 | 9.85 | 1.49700 | 81.5 |
| 19 | −60.926 | 0.58 | | |
| 20 | 53.513 | 1.91 | 1.85478 | 24.8 |
| 21 | 32.690 | 5.42 | 1.69350 | 53.2 |
| 22 | −920.851 | (variable) | | |
| 23 | −182.869 | 3.27 | 1.95906 | 17.5 |
| 24 | −42.349 | 1.15 | 1.83481 | 42.7 |
| 25 | 38.429 | (variable) | | |
| 26 | 80.892 | 9.97 | 1.51823 | 58.9 |
| 27 | −49.368 | (variable) | | |
| 28 | 121.097 | 8.94 | 1.48749 | 70.2 |
| 29 | −38.242 | 1.44 | 2.00100 | 29.1 |
| 30 | 323.181 | (variable) | | |
| 31 | ∞ | 5.00 | 1.51633 | 64.1 |
| 32 | ∞ | 2.00 | | |
| Image plane | ∞ | | | |

Aspheric surface data

6th surface

K = 0.00000e+000
A4 = −4.14167e−007
A6 = 5.90722e−009
A8 = −3.70354e−012

7th surface

K = 7.61646e−001
A4 = −5.73616e−006
A6 = −2.50810e−009
A8 = −2.37233e−012
A10 = 1.04964e−014

13th surface

K = −2.24431e+000
A4 = 8.16203e−006
A6 = −2.06412e−009
A8 = 6.13154e−012

14th surface

K = 2.15087e+008
A4 = 3.88144e−006
A6 = −9.79489e−010
A8 = 4.97163e−012
A10 = −2.56355e−015

Various data
Zoom ratio 6.73

| | Wide angle | Middle | Telephoto |
|---|---|---|---|
| Focal length | 24.72 | 99.78 | 166.47 |
| F-number | 4.12 | 4.12 | 4.12 |
| Half angle of view (deg) | 37.29 | 12.23 | 7.40 |
| Image height | 18.82 | 21.64 | 21.64 |
| Total lens length | 236.70 | 236.70 | 236.70 |
| BF | 23.98 | 23.98 | 23.98 |
| d5 | 0.56 | 32.07 | 45.57 |
| d11 | 46.48 | 14.98 | 1.48 |
| d12 | 34.05 | 2.41 | 1.49 |
| d22 | 2.74 | 12.86 | 16.64 |
| d25 | 24.07 | 41.26 | 37.99 |
| d27 | 0.49 | 4.82 | 5.24 |
| d30 | 18.68 | 18.68 | 18.68 |

Zoom lens unit data

| Unit | Start surface | Focal length |
|---|---|---|
| 1 | 1 | 104.12 |
| 2 | 6 | −25.38 |
| 3 | 13 | 36.74 |
| 4 | 23 | −41.27 |
| 5 | 26 | 60.75 |
| 6 | 28 | −82.51 |

Numerical Value Embodiment 3

[Unit mm]

Surface data

| Surface number | r | d | nd | vd |
|---|---|---|---|---|
| 1 | 358.132 | 2.54 | 1.83481 | 42.7 |
| 2 | 75.229 | 9.82 | 1.49700 | 81.5 |
| 3 | −3345.549 | 0.20 | | |
| 4 | 155.669 | 3.67 | 1.49700 | 81.5 |
| 5 | 545.970 | 0.20 | | |
| 6 | 80.662 | 8.04 | 1.59522 | 67.7 |
| 7 | −2158.076 | (variable) | | |
| 8 | 565.530 | 1.51 | 1.88300 | 40.8 |
| 9 | 26.962 | 5.94 | | |
| 10* | −304.190 | 1.24 | 1.58313 | 59.5 |
| 11* | 118.387 | 6.90 | | |
| 12 | −30.541 | 1.21 | 1.59522 | 67.7 |
| 13 | 221.164 | 0.20 | | |
| 14 | 110.294 | 4.34 | 1.85896 | 22.7 |
| 15 | −79.426 | (variable) | | |
| 16(stop) | ∞ | (variable) | | |
| 17* | 40.119 | 5.38 | 1.58313 | 59.4 |
| 18* | −1388.081 | 10.88 | | |
| 19 | 80.552 | 1.29 | 2.00100 | 29.1 |
| 20 | 35.470 | 0.20 | | |
| 21 | 36.883 | 2.55 | 1.95906 | 17.5 |
| 22 | 37.191 | 8.73 | 1.49700 | 81.5 |
| 23 | −57.004 | 0.48 | | |
| 24 | 43.989 | 1.24 | 2.00069 | 25.5 |
| 25 | 27.051 | 7.32 | 1.71999 | 50.2 |
| 26 | −733.720 | (variable) | | |

-continued

[Unit mm]

| | | | | |
|---|---|---|---|---|
| 27 | 404.748 | 2.75 | 1.95906 | 17.5 |
| 28 | −47.550 | 0.83 | 1.90043 | 37.4 |
| 29 | 26.196 | (variable) | | |
| 30 | 378.451 | 3.88 | 1.49700 | 81.5 |
| 31 | −38.907 | 0.83 | | |
| 32 | −29.469 | 3.88 | 1.49700 | 81.5 |
| 33 | −18.830 | 1.16 | 1.88300 | 40.8 |
| 34 | −32.311 | (variable) | | |
| 35 | −36.809 | 3.49 | 1.49700 | 81.5 |
| 36 | −24.158 | (variable) | | |
| 37 | ∞ | 3.42 | 1.51633 | 64.1 |
| 38 | ∞ | 2.00 | | |
| Image plane | ∞ | | | |

Aspheric surface data

10th surface

K = 2.71516e+002
A4 = 1.90789e−005
A6 = −7.10200e−008
A8 = 1.62327e−010

11th surface

K = −1.26376e+002
A4 = 2.68740e−005
A6 = −1.02545e−007
A8 = 2.23887e−010

17th surface

K = −1.97125e+000
A4 = 3.75039e−006
A6 = 1.24225e−009
A8 = 8.31605e−013

18th surface

K = −1.39007e+004
A4 = 3.84679e−006
A6 = 2.17981e−009
A8 = −1.62829e−012

Various data
Zoom ratio 9.70

| | Wide angle | Middle | Telephoto |
|---|---|---|---|
| Focal length | 17.51 | 83.09 | 169.77 |
| F-number | 3.61 | 3.60 | 3.61 |
| Half angle of view (deg) | 36.33 | 10.10 | 4.98 |
| Image height | 12.88 | 14.80 | 14.80 |
| Total lens length | 248.91 | 248.91 | 248.91 |
| BF | 40.40 | 40.40 | 40.40 |
| d7 | 0.46 | 47.30 | 67.37 |
| d15 | 68.41 | 21.57 | 1.49 |
| d16 | 30.55 | 4.89 | 5.20 |
| d26 | 1.99 | 12.17 | 17.41 |
| d29 | 4.49 | 18.86 | 12.28 |
| d34 | 1.90 | 3.02 | 4.05 |
| d36 | 36.15 | 36.15 | 36.15 |

Zoom lens unit data

| Unit | Start surface | Focal length |
|---|---|---|
| 1 | 1 | 124.65 |
| 2 | 8 | −23.77 |
| 3 | 17 | 35.29 |
| 4 | 27 | −32.67 |
| 5 | 30 | 217.93 |
| 6 | 35 | 129.55 |

Numerical Value Embodiment 4

[Unit mm]

Surface data

| Surface number | r | d | nd | vd |
|---|---|---|---|---|
| 1 | 269.568 | 3.57 | 1.91650 | 31.6 |
| 2 | 99.880 | 15.04 | 1.49700 | 81.5 |
| 3 | −2358.980 | 0.20 | | |
| 4 | 104.060 | 12.34 | 1.76385 | 48.5 |
| 5 | 1018.478 | (variable) | | |
| 6* | 14207.170 | 2.26 | 1.88202 | 37.2 |
| 7* | 47.308 | 15.47 | | |
| 8 | −51.929 | 3.51 | 1.69680 | 55.5 |
| 9 | 100.600 | 13.37 | 1.92286 | 18.9 |
| 10 | −69.240 | 2.24 | | |
| 11 | −51.395 | 3.55 | 1.95906 | 17.5 |
| 12 | −100.397 | (variable) | | |
| 13(stop) | ∞ | (variable) | | |
| 14 | 55.250 | 6.53 | 1.59522 | 67.7 |
| 15 | 227.172 | 20.81 | | |
| 16* | 52.308 | 11.07 | 1.49700 | 81.5 |
| 17* | −89.873 | 1.36 | | |
| 18 | 243.657 | 7.15 | 1.43875 | 94.9 |
| 19 | −54.690 | 1.55 | 1.64769 | 33.8 |
| 20 | 73.983 | (variable) | | |
| 21 | 93.595 | 2.44 | 1.95906 | 17.5 |
| 22 | 79.805 | 5.01 | 1.80139 | 45.5 |
| 23* | −446.190 | (variable) | | |
| 24 | −1462.939 | 3.17 | 1.95906 | 17.5 |
| 25 | −85.027 | 1.36 | 1.88202 | 37.2 |
| 26* | 38.454 | (variable) | | |
| 27* | 115.899 | 14.03 | 1.55332 | 71.7 |
| 28* | −62.909 | (variable) | | |
| 29 | ∞ | 9.44 | 1.51633 | 64.1 |
| 30 | ∞ | 2.00 | | |
| Image plane | ∞ | | | |

Aspheric surface data

6th surface

K = 0.00000e+000
A4 = 8.34238e−007
A6 = −1.17394e−010
A8 = 3.38299e−013

7th surface

K = 1.28491e+000
A4 = −1.36453e−006
A6 = −8.18123e−010
A8 = −7.71969e−013
A10 = 3.51337e−016

16th surface

K = −1.08830e+000
A4 = −2.85897e−007
A6 = −1.24277e−010
A8 = −3.28163e−013

17th surface

K = −1.58356e+000
A4 = 1.77885e−006
A6 = −9.20963e−010
A8 = 1.81893e−013

23th surface

K = 1.13006e+001
A4 = −2.97738e−008
A6 = 2.86159e−010
A8 = −2.78264e−013

26th surface

K = 6.40134e−001
A4 = −1.82840e−006

-continued

[Unit mm]

A6 = −6.97982e−010
A8 = −3.45367e−012
27th surface

K = −4.69148e+000
A4 = 1.09920e−006
A6 = 5.59605e−010
A8 = 1.00370e−012
A10 = −1.83869e−015
28th surface K = −8.33348e+000
A4 = −2.10074e−006
A6 = 2.15863e−009
A8 = 5.37001e−013
A10 = −1.98537e−015

Various data
Zoom ratio 9.69

|  | Wide angle | Middle | Telephoto |
|---|---|---|---|
| Focal length | 27.81 | 146.83 | 269.60 |
| F-number | 2.88 | 2.88 | 2.88 |
| Half angle of view (deg) | 34.09 | 8.38 | 4.59 |
| Image height | 18.82 | 21.64 | 21.64 |
| Total lens length | 340.47 | 340.47 | 340.47 |
| BF | 32.97 | 32.97 | 32.97 |
| d5 | 0.44 | 66.93 | 89.10 |
| d12 | 90.71 | 24.21 | 2.05 |
| d13 | 42.28 | 5.22 | 2.63 |
| d20 | 13.90 | 2.53 | 18.01 |
| d23 | 2.01 | 17.31 | 13.80 |
| d26 | 12.14 | 45.27 | 35.88 |
| d28 | 24.75 | 24.75 | 24.75 |

Zoom lens unit data

| Unit | Start surface | Focal length |
|---|---|---|
| 1 | 1 | 164.64 |
| 2 | 6 | −39.06 |
| 3 | 14 | 71.75 |
| 4 | 21 | 99.72 |
| 5 | 24 | −44.04 |
| 6 | 27 | 75.81 |

Relationships between the above-mentioned respective conditional expressions and various numerical Value Embodiments are shown in Table 1.

TABLE 1

| Conditional expression | | Numerical Value Embodiment | | | |
|---|---|---|---|---|---|
|  |  | 1 | 2 | 3 | 4 |
| (1) | m2/m3 | −1.368 | −1.382 | −2.640 | −2.236 |
| (2) | L3w/fw | 2.759 | 4.977 | 8.294 | 7.370 |
| (3) | ν1 | 29.84 | 35.25 | 42.73 | 31.60 |
| (4) | f2/ft | −0.153 | −0.152 | −0.140 | −0.145 |
| (5) | ft/fw | 4.707 | 6.734 | 9.696 | 9.694 |
| (6) | D1/fw | 0.562 | 0.839 | 1.397 | 1.120 |
| (7) | D1/f1 | 0.215 | 0.199 | 0.196 | 0.189 |
| (8) | m3/fw | −0.661 | −1.317 | −1.448 | −1.426 |
| (9) | f2/fw | −0.720 | −1.027 | −1.358 | −1.405 |
| (10) | ν2 | 74.70 | 67.74 | 81.54 | 81.54 |
| (11) | L23w/TDw | 0.283 | 0.338 | 0.396 | 0.387 |
| (12) | f2/fn2 | 0.606 | 0.615 | 0.728 | 0.887 |

As described above, according to any of these embodiments, it is possible to realize a zoom lens which achieves a small size, a wide angle, a large magnification, and good optical properties including correction of a chromatic aberration among others.

Next, an embodiment of a video camera using the zoom lens of the disclosure as an image pickup optical system will be described with reference to FIG. 17.

Figure 17:
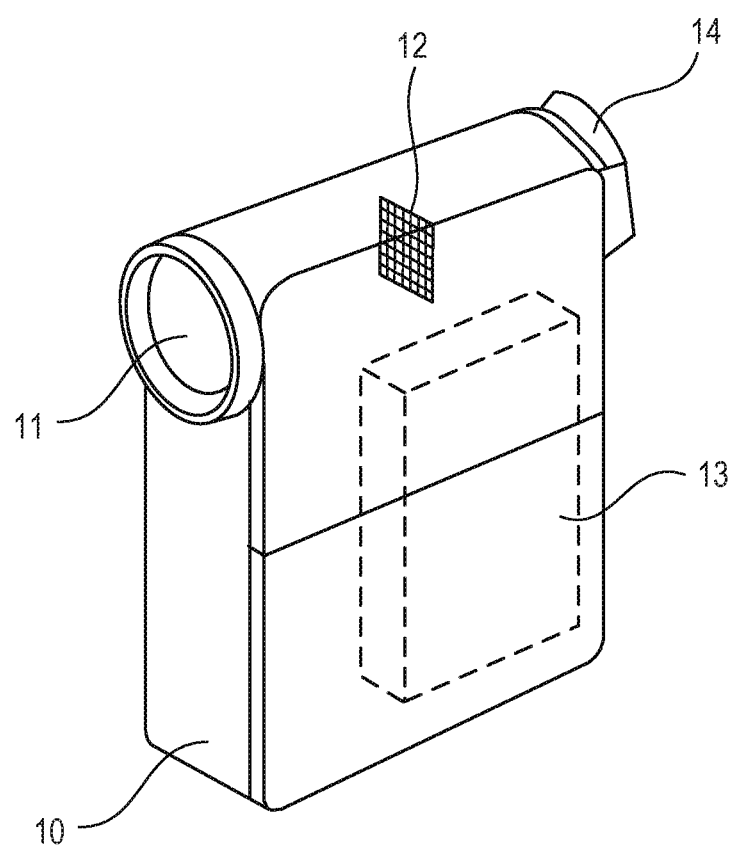
FIG. 17 is a diagram for explaining an image pickup apparatus according to an embodiment of the disclosure.

In FIG. 17, reference numeral 10 denotes a video camera body, reference numeral 11 denotes an image pickup optical system formed by the zoom lens of the disclosure, reference numeral 12 denotes an image pickup element such as a CCD that receives an object image by using the image pickup optical system 11, reference numeral 13 denotes a recording unit that records the object image received by the image pickup element 12, and reference numeral 14 denotes a finder used for observing the object image displayed on a not-illustrated display element. The aforementioned display element is formed from a liquid crystal panel or the like and designed to display the object image formed on the image pickup element 12.

By applying the image pickup apparatus of the disclosure to an optical instrument such as the video camera as described above, it is possible to realize the optical instrument that achieves high optical properties with a small size.

Here, when an electronic image pickup element such as the CCD is used as the image pickup element, it is possible to achieve even higher image quality of an outputted image by correcting aberrations electronically.

While the disclosure has been described with reference to exemplary embodiments, it is to be understood that the disclosure is not limited to the disclosed exemplary embodiments. The scope of the following claims is to be accorded the broadest interpretation to encompass all such modifications and equivalent structures and functions.

This application claims the benefit of Japanese Patent Application No. 2018-107576, filed Jun. 5, 2018, which is hereby incorporated by reference herein in its entirety.

What is claimed is:

1. A zoom lens comprising in order from an object side to an image side:
   a first lens unit having a positive refractive power;
   a second lens unit having a negative refractive power;
   an intermediate lens group consisting of one or two lens units having a positive refractive power, including a third lens unit located on a most object side in the intermediate lens group;
   a lens unit having a negative refractive power; and
   a rear lens group consisting of one or two lens units including a lens unit having a positive refractive power and located on a most object side in the rear lens group,
   wherein an interval between each pair of two adjacent lens units changes for zooming,
   wherein each of the first lens unit and the second lens unit includes at least three lenses, and
   wherein conditional expressions $-10 < m2/m3 < -0.5;$ $2.0 < L3w/fw < 8.7;$ $27.0 < \nu 1 < 45.0;$ and $-0.4 < f2/ft < -0.1$ are satisfied where m2 is an amount of movement of the second lens unit from a wide angle end to a telephoto end, m3 is an amount of movement of the third lens unit from the wide angle end to the telephoto end, each of m2 and m3 has a positive value in a case where a corresponding lens unit at the telephoto end is located on the image side relative to the corresponding lens unit at the wide angle end, L3w is a distance at the wide angle end from a vertex of a lens surface located closest to the object side in the first lens unit to a vertex of a lens surface located closest to the object side in the third lens unit, ν1 is an Abbe number of the lens located closest to the object side in the first lens unit, f2 is a focal length of the second lens unit, fw is a focal length at the wide angle end, and ft is a focal length at the telephoto end.

2. The zoom lens according to claim 1, wherein a conditional expression $$3<ft/fw<10$$

is satisfied.

3. The zoom lens according to claim 1, wherein a conditional expression $$0.5<D1/fw<1.7$$

is satisfied where D1 is a thickness on an optical axis of the first lens unit.

4. The zoom lens according to claim 1, wherein a conditional expression $$0.17<D1/f1<0.28$$

is satisfied where D1 is a thickness on an optical axis of the first lens unit, and f1 is a focal length of the first lens unit.

5. The zoom lens according to claim 1, wherein a conditional expression $$-1.6<m3/fw<-0.55$$

is satisfied.

6. The zoom lens according to claim 1, wherein a conditional expression $$-1.5<f2/fw<-0.6$$

is satisfied.

7. The zoom lens according to claim 1, wherein a conditional expression $$65<\nu2<98$$

is satisfied where ν2 is an Abbe number of a lens located second closest to the object side in the first lens unit.

8. The zoom lens according to claim 1, wherein a conditional expression $$0.25<L23w/TDw<0.45$$

is satisfied where L23w is a distance at the wide angle end from a vertex of a lens surface located closest to the image side in the second lens unit to the vertex of the lens surface located closest to the object side in the third lens unit, and TDw is a total length of the zoom lens at the wide angle end.

9. The zoom lens according to claim 1, wherein a conditional expression $$0.5<f2/fn2<1.0$$

is satisfied where fn2 is a focal length of a lens unit located closest to the object side of lens units having negative refractive power and arranged on the image side relative to the third lens unit.

10. An image pickup apparatus comprising:
a zoom lens comprising in order from an object side to an image side:
a first lens unit having a positive refractive power and configured not to move for zooming;
a second lens unit having a negative refractive power;
an intermediate lens group consisting of one or two lens units having a positive refractive power, including a third lens unit located on a most object side in the intermediate lens group;
a lens unit having a negative refractive power; and
a rear lens group consisting of one or two lens units including a lens unit having a positive refractive power and located on a most object side in the rear lens group,
wherein an interval between each pair of two adjacent lens units changes for zooming,
wherein each of the first lens unit and the second lens unit includes at least three lenses, and
wherein conditional expressions $$-10<m2/m3<-0.5;$$

$$2.0<L3w/fw<8.7;$$

$$27.0<\nu1<45.0; \text{ and}$$

$$-0.4<f2/ft<-0.1$$

are satisfied where m2 is an amount of movement of the second lens unit from a wide angle end to a telephoto end, m3 is an amount of movement of the third lens unit from the wide angle end to the telephoto end, each of m2 and m3 has a positive value in a case where a corresponding lens unit at the telephoto end is located on the image side relative to the corresponding lens unit at the wide angle end, L3w is a distance at the wide angle end from a vertex of a lens surface located closest to the object side in the first lens unit to a vertex of a lens surface located closest to the object side in the third lens unit, ν1 is an Abbe number of the lens located closest to the object side in the first lens unit, f2 is a focal length of the second lens unit, fw is a focal length at the wide angle end, and ft is a focal length at the telephoto end; and
an image pickup element located on an image plane of the zoom lens.

11. The image pickup apparatus according to claim 10, wherein, in the zoom lens, a conditional expression $$3<ft/fw<10$$

is satisfied.

12. The image pickup apparatus according to claim 10, wherein, in the zoom lens, a conditional expression $$0.5<D1/fw<1.7$$

is satisfied where D1 is a thickness on an optical axis of the first lens unit.

13. The image pickup apparatus according to claim 10, wherein, in the zoom lens, a conditional expression $$0.17<D1/f1<0.28$$

is satisfied where D1 is a thickness on an optical axis of the first lens unit, and f1 is a focal length of the first lens unit.

14. The image pickup apparatus according to claim 10, wherein, in the zoom lens, a conditional expression $$-1.6<m3/fw<-0.55$$

is satisfied.

15. The image pickup apparatus according to claim 10, wherein, in the zoom lens, a conditional expression $$-1.5<f2/fw<-0.6$$

is satisfied.

16. The image pickup apparatus according to claim 10, wherein, in the zoom lens, a conditional expression $$65<\nu2<98$$

is satisfied where ν2 is an Abbe number of a lens located second closest to the object side in the first lens unit.

17. The image pickup apparatus according to claim 10, wherein, in the zoom lens, a conditional expression $$0.25<L23w/TDw<0.45$$

is satisfied where L23w is a distance at the wide angle end from a vertex of a lens surface located closest to the image side in the second lens unit to the vertex of the lens surface located closest to the object side in the third lens unit, and TDw is a total length of the zoom lens at the wide angle end.

18. The image pickup apparatus according to claim 10, wherein, in the zoom lens, a conditional expression $$0.5 < f2/fn2 < 1.0$$

is satisfied where fn2 is a focal length of a lens unit located closest to the object side of lens units having negative refractive power and arranged on the image side relative to the third lens unit.

* * * * *